United States Patent [19]

Tauer

[11] 4,309,699
[45] Jan. 5, 1982

[54] PASSIVE ELECTRO-OPTICAL DISPLAY DEVICE

[75] Inventor: Karl M. Tauer, Munich, Fed. Rep. of Germany

[73] Assignee: Siemens Aktiengesellschaft, Berlin & Munich, Fed. Rep. of Germany

[21] Appl. No.: 90,293

[22] Filed: Nov. 1, 1979

[30] Foreign Application Priority Data

Nov. 14, 1978 [DE] Fed. Rep. of Germany ....... 2849381

[51] Int. Cl.³ .............................................. G09F 9/32
[52] U.S. Cl. .................................. 340/715; 340/756; 340/784; 340/759
[58] Field of Search ................ 350/336; 340/715, 784, 340/756–765

[56] References Cited

U.S. PATENT DOCUMENTS

Re. 29,727  8/1978  Fujita ................................. 350/336
3,548,403  12/1970  Johnson ............................ 340/715
3,866,171   2/1975  Loshbough ....................... 340/715
4,110,744   8/1978  Laesser ............................. 350/336
4,142,182   2/1979  Kmetz ............................... 350/336

Primary Examiner—Marshall M. Curtis
Attorney, Agent, or Firm—Hill, Van Santen, Steadman, Chiara & Simpson

[57] ABSTRACT

A passive optical display device, which has at least one digit place, has a cavity which is formed by space plates and contains a material which is switchable between different optical states by an electric field, and has electrodes on the surfaces of the plates with the electrode on one surface having seven segments characterized by the segment being interconnected into four separate groups and the electrodes on the other surface being in two parts with the shape of the groups and parts being selected so that if one of the parts or groups does not receive an electrical voltage when it should, the symbol becomes meaningless.

12 Claims, 5 Drawing Figures

FIG 3

| | 8,a+c | 8,b+f | 8,e+g | 8,d+h | R₁ | R₂ |
|---|---|---|---|---|---|---|
| 1 | ı | ı | ı | ı | ı | ı |
| 2 | ᴄ | Ē | ⊐ | P | ∟ | ⊐ |
| 3 | ᴝ | ⊐ | ⊐ | ꟻ | ⌐ | ⊐ |
| 4 | ∪ | ⊓ | ⊔ | 4 | ı¦ | ⌐ |
| 5 | ᴇ | ⊐ | ⊐ | ⊆ | ⊔ | ⩵ |
| 6 | ᴇ | ō | ⊔ | ꟻ | ∪ | ⩵ |
| 7 | ı | ⊓ | ⊓ | ⊓ | ı | ⊓ |
| 8 | ᴇ | ō | ⊐ | ꟻ | ∪ | ⊐ |
| 9 | ᴜ | ⊐ | ⊐ | ꟼ | ∪ | ⊐ |
| 0 | ∪ | ⊔ | ⊐ | ⊓ | ∪ | ⊓ |

FIG 5

|   | 8 a+b | 8 d+f | 8 e+g | 8,c+h | r1 | r2 |
|---|---|---|---|---|---|---|
| 1 | ı | 1 | 1 | ı | ı | ı |
| 2 | c | ? | 2 | 2 | ⌐ | ⌐ |
| 3 | ⊐ | ? | ⊐ | ⊐ | ⌐ | ⊐ |
| 4 | ւ | ┥ | ıı | U | U | ı |
| 5 | ҕ | ҕ | ҕ | ⌐ | L | ⊐ |
| 6 | b | ⊓ | ҕ | E | L | ū |
| 7 | ı | ٦ | ٦ | ٦ | ı | ٦ |
| 8 | b | ⊓ | ⊐ | P | U | ū |
| 9 | ҕ | ? | ⊐ | ⊐ | U | ⊐ |
| 0 | U | ⊓ | ⊐ | ⊂ | ıı | ū |

PASSIVE ELECTRO-OPTICAL DISPLAY DEVICE

BACKGROUND OF THE INVENTION

The present invention is directed to a display device in which a pair of plates are interconnected in space relationship to form a cavity for receiving a medium, such as a liquid crystal, that has switchable optical states. For each digit place, one plate will have electrical conducting coatings arranged as an electrode in a pattern of seven segments that are interconnected to form four groups of actuatable segments and the second plate has a pair of electrodes arranged to overlie the segments of the groups.

A display in which the seven segments on one plate are interconnected in groups and the back electrode is divided into two parts overlying a segment of each group is disclosed in U.S. Pat. No. 3,781,863, which was based on the same Japanese patent application as German O.S. No. 21 63 634. In operation of this device or other known liquid crystal displays, a failure of one of the segments or electrodes to become actuated at the desired time due to an interruption or break in the supply circuit or due to the shorting of the two segments together will cause an erroneous display to be exhibited. If a different number or symbol appears instead of the proper symbol, then a falsification cannot be recognized by the operator. In calibrated instruments, such a circumstance is not acceptable.

If the display device generates its own light, then the necessary current strengths are generally so high that one can monitor the display by means of a measurement of the segmented currents. This method however is not practical in displays such as the liquid crystal display, which modulates external light and use a very small amount of energy. Therefore up until now, the liquid crystal display usually had either received redundant or even finer segmentation in order to prevent the display of erroneous information. Examples of these devices are disclosed in U.S. Pat. No. 4,037,927 which includes the disclosure of the German O.S. No. 24 02 749 and in U.S. Pat. No. 4,054,368 which includes the disclosure of German O.S. No. 24 59 488. A difficulty with this precaution is that the finer segmentation increases the cost the fabrication of the device and and increases both the cost and number of problems with controlling the device.

SUMMARY OF THE INVENTION

The object of the present invention is to develop a passive electro-optical display device that during operation either displays the proper numerical value or symbol or on the other hand displays the meaningless configuration when a segment or electrode is not energized. In order to achieve this object, the invention is directed to improvement in a passive optical display device with at least one digit place, said device comprising a pair of plates being connected together in spaced relationship to form a cavity containing a medium switchable between two optical states by the application of an electric field, each of said plates on a surface facing the cavity having electrically conductive coatings with the coating of a first of said pair of plates for each digit place being arranged in an electrode pattern of seven segments having an upper, center, and lower cross segments and an upper left, upper right, lower left and lower right side segments and the second of said pair of plates being provided with two electrodes with the first of said two electrodes overlying four of the seven segments of the first plate and the second of the two electrodes overlying the three remaining segments. The improvement comprises means interconnecting the seven segments into four actuatable groups with three of said groups having two segments and the fourth group only having one segment, said first electrode overlying a segment in each of said four groups and the second electrode overlying the other segment of each of the first three groups, said means for interconnecting and said first and second electrodes enabling creation of a display of any number at each digit place and preventing displaying of a false number when any of the groups or the two electrodes fail to receive an electric voltage.

The device may include a punctuation segment on the first plate, which is connected with the single segment of the fourth group. The punctuation segment can be either a decimal point or a comma.

In one of the embodiments, the means for interconnecting connects the top cross and lower right side segments as group one, the upper right side and the upper left side segments as group two, the lower left side and the central cross segments as group three, and the fourth group will be formed by the bottom cross segment either by itself or connected to the punctuation segment. In this arrangement, the first electrode will overlie the bottom cross segment and the lower right, the lower left and the upper left side segments. The second electrode will overlie the upper and central cross segments, the upper right side segment and the punctuation segment, if present.

In another embodiment, the means for interconnecting interconnects the top cross and upper right side segments as group one, the bottom cross and the upper left side segments as group two, the central cross and lower left side segments as group three, with group four being formed by either the lower right side segment by itself or connected to the punctuation segment, if present. The back segments or electrodes have the first electrode overlying the top cross and the bottom cross segments as well as the lower right side and left side segments, and the second electrode in this embodiment will then overlie the central cross segments and the upper right and upper left side segments as well as the punctuation segment, if present.

The display device will preferably have n-digit places and to reduce the number of connections or electrical leads for the device, the first electrode of each of the n-digit places are interconnected and the second electrode of each n-digit places are interconnected so the display can be operated in a two step multiplex process with the first electrodes being energized and then the selected groups of each digit place being energized during the final period or time interval. Then during the second time interval the second electrodes and the selected groups of the segment for each digit place are energized. Another possibility with n-digit places is that each of the first and second electrodes are individually actuated for each n-digit place and each of the four groups of each digit are interconnected with the first group of each digit being actuated simultaneously. Thus, in operation a four step multiplex is obtained by first actuating all of the group ones and then the selected first and second electrodes for each digit and then actuating all of the second groups and so on.

Seven segment displays with a subdivided back electrode and the segments collected or connected together to form larger units have been under discussion for some time for the purpose of rendering possible matrix control and to reduce the cost for various connections. Examples of these devices are disclosed in U.S. Pat. No. 4,113,361, which was based on the same Japanese application as German O.S. No. 26 04 238. Other examples are disclosed in an article by Paul Smith, "Multiplexing Liquid-Crystal Display", *Electronics*, May 25, 1978, pp. 113–121, and article by Ian Holt, "LCD Environmental and Multiplex Problems Now Solved", *Electron*, Sept. 15, 1977, pp. 48–55 and also in the above mentioned U.S. Pat. No. 3,781,863. However, in each of these devices, the viewer is not protected from reading errors which will occur by failure to activate the selected electrodes as proposed in accordance with the present invention. The protection from reading errors due to malfunction will only occur when the electrode matrix is organized in the manner proposed by the present invention.

The display devices of the present application are particularly useful when used in a calibrated instrument such as scales, or measuring devices.

BRIEF DESCRIPTION OF THE DRAWINGS

FIG. 3 is a chart illustrating the symbols being displayed with a failure of any group or back electrodes for the device of FIG. 2;

FIG. 5 is a chart illustrating the symbols being displayed with a failure of any group or electrode of the device of FIG. 4.

DESCRIPTION OF THE PREFERRED EMBODIMENTS

Figure 1:
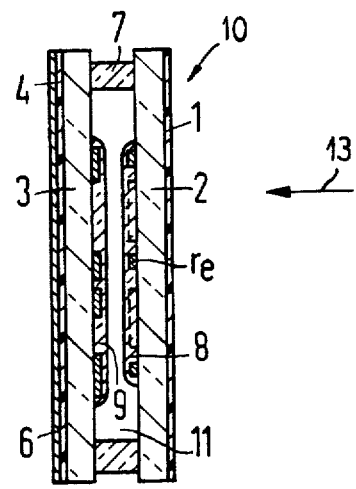
FIG. 1 is a cross section on line I—I of FIG. 2 of a display device of the present invention.
Figure 2:
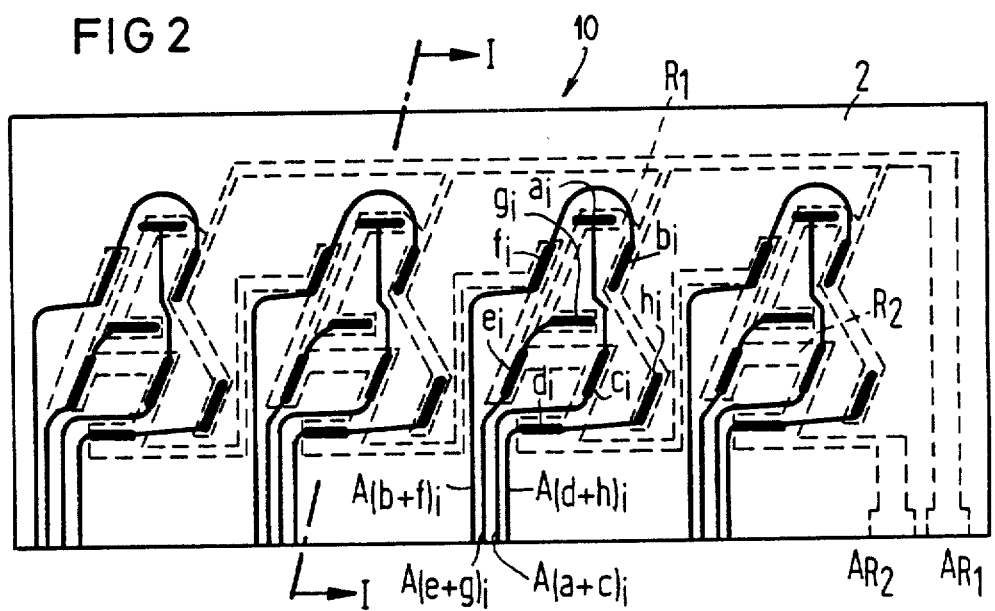
FIG. 2 is a plan view of one embodiment of the display device of the present invention.

The principles of the present invention are particularly useful when incorporated in an electro-optical display device generally indicated at 10 in FIGS. 1 and 2. The display is useful in a scale, measuring device or other calibrated instruments.

The display 10 is a liquid crystal display that functions according to the principle of the so-called "twisted cell" and has four digit places to enable displaying a four-digit number. When taken in the direction of viewing indicated by an arrow 13, the display device 10 consists of a front linear polarizer 1, a front carrier plate 2, a back carrier plate 3, a back linear polarizer 4, which has its direction of polarization crossed with respect to the direction of polarization of front linear polarizer 1, and a reflector 6. The two carrier plates are tightly connected with one another at a specific interval or spacing via a frame 7 to form a cavity or chamber 11. The plates 2 and 3, respectively, bear electrically conductive coatings as well as orientation layers 8, 9 on their interior surface which face the cavity 11. The chamber 11 which is limited by the two substrates and the frame is filled with a liquid crystal layer. A more detailed presentation of a "twisted cell" may be found in the British Pat. No. 1,372,868 which is based on the Swiss application as German A.S. No. 21 58 563.

As best illustrated in FIG. 2, each of the n-digit places has a front electrode having a pattern of a seven segment figure "8" and a pair of back electrodes. The segments for digit place i are identified as a top cross segment $a_i$; an upper right side segment $b_i$; a lower right side segment $c_i$; a lower or bottom cross segment $d_i$; a lower left side segment $e_i$; an upper left side segment $f_i$; and a middle or center cross segment $g_i$. In addition, each digit place has a punctuation or decimal point segment $h_i$. When four digit places are present i designated the digit place and has a value of $1 \leq i \leq 4$.

According to the invention the device 10 has means interconnecting the segments into four actuatable groups. Thus, top cross segment a is connected to lower right side segment $c_i$ to form a first pair or group $A_{(a+c)}$; the upper right side segment b and upper left side segment f form a second group or pair $A_{(b+f)}$; the lower left side segment e and the center cross segment g form a third pair or group $A_{(e+g)}$ and the fourth pair or group $A_{(d+h)}$ is formed by the lower cross segment d and punctuation segment h.

The two back electrodes overlie the segments with electrode $R_1$ overlying or being alignment with segments a, b, g and h. The other electrode $R_2$ is behind c, d, e and f.

FIG. 3 indicates which segment configurations are displayed when individual groups of segments or back electrodes fail. In the first column of the table, the desired or correct numerals from one through nine are listed below one another. In the following columns, those respective characters are entered which are displayed instead of the correct numbers when the groups or pairs a+c (second columns), b+f (third column), e+g (fourth column), d+h (fifth column), or the back electrodes $R_1$ (sixth column) or, $R_2$ (seventh column) receive a voltage that is not sufficient to switch the liquid crystal material. One can see that either the desired numerals appear or, on the other hand, incomprehensible symbols appear. The display, thus, can be verificated and will indicate a failure of an electrode or group of segments.

In the illustrated example, the four first back electrodes $R_1$ are conducted to a common terminal $A_{R1}$ and the four second back electrodes $R_2$ are in turn conducted to a common terminal $A_{R2}$. There arises a matrix with two back electrode terminals and sixteen front electrode terminals ($A_{(a+c)i}$, $A_{(b+f)i}$, $A_{(e+g)i}$ and $A_{(d+h)i}$), which can be addressed as follows in a two-step multiplex process; in a first time interval or clock pulse, an addressing voltage is applied to the one back electrode terminal and, at the same time, signal voltages are applied to the sixteen front electrode terminals. In a second time interval or clock pulse, the second back electrode terminals are activated with an addressing voltage and again all sixteen front electrode terminals are charged with the necessary signals.

The electrodes of each digit place could also be connected with one another in a different manner. Thus, instead of the back electrodes $R_1$ and $R_2$ being connected to their respective terminal $A_{R1}$ and $A_{R2}$, the front segment pairs or groups that correspond to one another could be interconnected so that four common front electrode terminals $A_{a+c}$, $A_{b+f}$, $A_{e+g}$ and $A_{d+h}$ occur in addition to the eight individual back electrode terminals $A_{(R1)i}$, $A_{(R2)i}$. Such a matrix could be actuated in a four-step multiplex process, by addressing each of the four common front segment pair or group terminals in succession and provide the eight individual back electrode terminals with the corresponding signals at each of the four addressing times.

Figure 4:
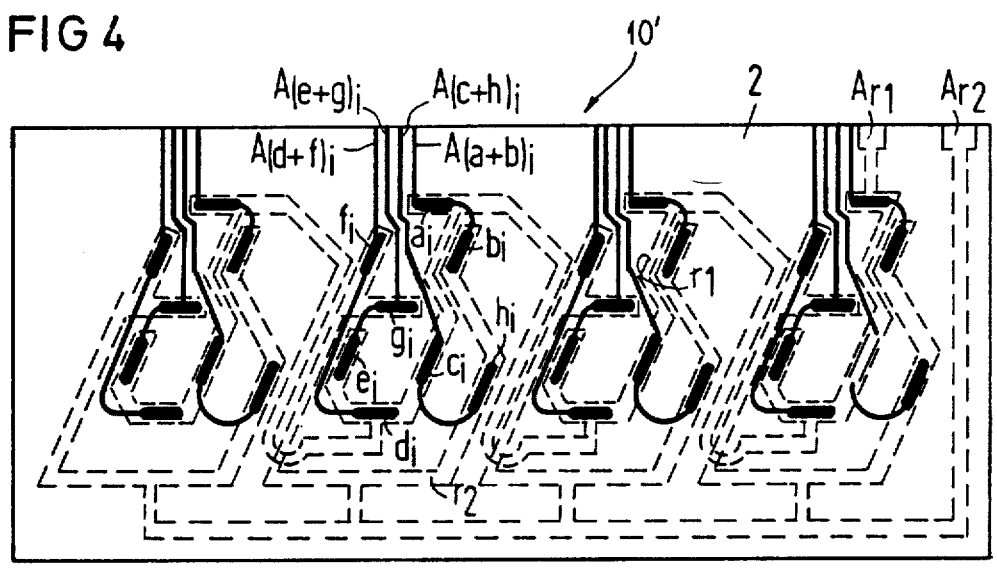
FIG. 4 is a plan view of a second embodiment of the present invention.

A second embodiment of the device, is indicated at 10' in FIG. 4 and deviates from the first embodiment both in the linkage of the segment pair or groups as well as in the dimensioning of the back electrodes. As illustrated the first segment pair or group $A_{a+b}$ is formed by the top cross segment a being connected to the upper right side segment b: the second segment pair or group $A_{d+f}$ is formed by the connection of the bottom cross segment d to the upper left side segment f; the third segment pair or group $A_{e+g}$ is formed by the lower left side segment e connected to the center cross segment g; and the fourth group $A_{c+h}$ is formed by the lower right side segment c being connected to the punctuation segment h. The back electrodes $r_1$ and $r_2$ are shaped so that the electrode $r_1$ overlies or is behind segments a, c, d and e. The second back electrode $r_2$ overlies or is behind segments b, f, g and h.

In FIG. 5, a chart similar to the chart of FIG. 3 is provided for the embodiment of FIG. 4. Thus, if the number 6 is suppose to be displayed, the column illustrates the symbol that will be displayed if the segment group or electrode is not energized. This is only true if the "6" is deemed to be correctly displayed only when the upper or top cross segment is seen.

The device 10' can be operated in either a two step multiplex or a four step multiplex depending on whether the corresponding back electrodes of each digit places are connected to the same terminal or whether the segment group are connected to four terminals.

The invention is not limited to the illustrative embodiment. For example the number of digit places can be lesser or greater than four. In addition the principle of the invention can be used with other electro-optical displays, which have low segment currents and therefore can not be easily monitored, to indicate when a failure occurs.

Although various minor modifications may be suggested by those versed in the art, it should be understood that I wish to embody within the scope of the patent warranted hereon, all such modifications as reasonably and properly come within the scope my contribution to the art.

I claim:

1. In a passive optical display device having at least one digit place, said device comprising a pair of plates being connected together in space relationship to form a cavity containing a medium switchable between two optical states by an application of an electrical field, each of said plates on a surface facing the cavity having electrically conductive coatings with the coatings on a first of said pair of plates of each digit being arranged in an electrode pattern of seven segments having upper, center, and lower cross segments and upper left, upper right, lower left, and lower right side segments, and the second of said pair of plates being provided with two electrodes with the first of said electrodes overlying four of the seven segments of the first plate and the second of the two electrodes overlying the other three of the segments, the improvement comprising means for interconnecting the seven segments into four actuatable groups with three of said groups having two segments and the fourth group only having one segment, said means interconnecting the top cross and lower right side segments as group one, the upper right side and upper left side segments as group two, and the lower left side and the center cross segments as group three, said first electrode overlying a segment in each of said four groups and the second electrode overlying the other segment of the first three groups, said means for interconnecting and said first and second electrodes enabling creating a display of any number at each digit place and preventing displaying of a false number when any of the four groups and two electrodes fail to receive an electrical voltage.

2. In a passive optical display device according to claim 1, wherein each digit place has an additional punctuation segment on said surface of said first plate, said means for interconnecting connecting said punctuation segment to the bottom cross segment to form a group four, and said second electrode overlies the punctuation segment.

3. In a passive optical display device according to claim 1, wherein the first electrode overlies the bottom cross segment and the lower right, lower left and upper left side segments and the second electrode overlies the upper and center cross segments and the upper right side segment.

4. In a passive optical display device according to claim 3, which includes an additional punctuation segment on said first plate, said punctuation segment being connected by the means for interconnecting to the bottom cross segment and said second electrode overlying said punctuation segment.

5. In a passive optical display device according to claim 1, which device includes n-digit places, all of the first electrodes of each n-digit places being interconnected and all of the second electrodes of the n-digit places being interconnected so that display device is operated in a two step multiplex operation with all of the first electrodes being energized during one time period with selected groups being energized for each digit place and then all of the second electrodes are energized with the selected groups being energized for each digit place during a following time period.

6. In a passive optical display device according to claim 1, wherein the device has n-digit places, each of the first and second electrodes for each digit being individually energized, each of the four groups of segments being interconnected with the corresponding group of the n-digit place so that the display is operated in a four step multiplex operation with the four interconnected groups being energized in four separate steps and the selected first and second electrode of each digit place being energized during each of the four steps.

7. In a passive optical display device having at least one digit place, said device comprising a pair of plates being connected together in space relationship to form a cavity containing a medium switchable between two optical states by an application of an electrical field, each of said plates on a surface facing the cavity having electrically conductive coatings with the coatings on a first of said pair of plates of each digit being arranged in an electrode pattern of seven segments having upper, center, and lower cross segments and upper left, upper right, lower left, and lower right side segments, and the second of said pair of plates being provided with two electrodes with the first of said electrodes overlying four of the seven segments of the first plate and the second of the two electrodes overlying the other three of the segments, the improvement comprising means for interconnecting the seven segments into four actuatable groups with three of said groups having two segments and the fourth group only having one segment, said means for interconnecting connecting top cross and upper right side segments as group one, the bottom cross and the upper left side segments as group two, the center cross and the lower left side segments as group three, said first electrode overlying a segment in each of said four groups and the second electrode overlying the other segment of the first three groups, said means for interconnecting and said first and second electrodes enabling creating a display of any number at each digit place and preventing displaying of a false number when any of the four groups and two electrodes fail to receive an electrical voltage.

8. In a passive optical display device according to claim 7, which includes a punctuation segment for each of the digit places of the display on said first plate, said punctuation segment being interconnected to the lower right side segment to form group four, said second electrode overlying the punctuation segment.

9. In a passive optical display device according to claim 7, wherein the first electrode overlies the top cross, the bottom cross, the lower right side and lower left side segments and the second electrode overlies the center cross and upper right side and upper left side segments.

10. In a passive optical display device according to claim 9, which includes an additional punctuation segment on said first plate, said punctuation segment being connected by the means for interconnecting to the lower right side segment and said second electrode overlying said punctuation segment.

11. In a passive optical display device according to claim 9, which device includes n-digit places, all of the first electrodes of each n-digit places being interconnected and all of the second electrodes of the n-digit places being interconnected so that display device is operated in a two step multiplex operation with all of the first electrodes being energized with, selected groups for each digit place during a first step and then during the second step all of the second electrodes with selected groups for each digit place energized.

12. In a passive optical display device according to claim 9, wherein the device has n-digit places, each of the first and second electrodes for each digit being individually energized, each of the four groups of segments being interconnected with the corresponding group of the n-digit places so that the display is operated in a four step multiplex operation with the four interconnected groups being energized in four separate steps and the selected first and second electrodes for each digit place being energized during each of the four steps.

* * * * *